US005096527A

United States Patent [19]

Biagiotti

[11] Patent Number: 5,096,527

[45] Date of Patent: Mar. 17, 1992

[54] PROCESS AND APPARATUS FOR EMBOSSING WITH CYLINDERS HAVING PROTRUSIONS INCLINED IN TWO DIRECTIONS

[75] Inventor: Guglielmo Biagiotti, Capannori, Italy

[73] Assignee: Fabio Perini S.p.A., Lucca, Italy

[21] Appl. No.: 434,720

[22] Filed: Nov. 13, 1989

[30] Foreign Application Priority Data

Nov. 23, 1988 [IT] Italy ........................ 9529 A/88

[51] Int. Cl.[5] ................ B32B 31/20; B32B 31/22

[52] U.S. Cl. ........................ 156/209; 156/459; 156/553; 264/284; 425/385

[58] Field of Search ............ 156/206, 209, 220, 459, 156/472, 462, 205, 553; 162/112, 113, 132; 425/336, 369, 385; 264/284

[56] References Cited

U.S. PATENT DOCUMENTS 3,730,803 5/1973 Morrison .................... 156/205
3,961,119 6/1976 Thomas .................... 156/205 X
4,483,728 11/1984 Bauernfeind .................... 156/209
4,614,632 9/1986 Kezuka .................... 425/369 X

*Primary Examiner*—Michael W. Ball
*Assistant Examiner*—Michele K. Yoder
*Attorney, Agent, or Firm*—Francis J. Bouda

[57] ABSTRACT

The web embossing machine of the present invention has two embossing cylinders brought close to one another for combining two paper webs by the pressure contact between mutually corresponding protrusions on the two cylindrical surfaces. The protrusions are in rows which present a pattern inclined relative to the axes of the respective cylindrical surfaces, i.e., in a helicoidal fashion and relative to a plane passing at right angle through said axes, and thus achieve a subsequent and progressive contact instead of a simultaneous contact throughout the row. The inclination relative to a plane passing at right angle through the cylinder axis avoids repetitive pressure actions on the pressure rollers cooperating with the embossing cylinders.

10 Claims, 2 Drawing Sheets

PROCESS AND APPARATUS FOR EMBOSSING WITH CYLINDERS HAVING PROTRUSIONS INCLINED IN TWO DIRECTIONS

The invention relates to embossing machines for the paper converting industry of the type which comprise two embossing cylinders cooperating with respective rollers having rubber-covered surfaces to impress a pattern on two respective paper webs which are driven onto two embossing cylinders. In some cases, these two cylinders are also brought close to one another for cooperating at the junction of the two paper webs (which have been respectively embossed by said two cylinders) by pressure between the mutually corresponding protrusions of the two embossing cylinders. At least one of the two paper webs is moistened after embossing between an embossing cylinder and its mating rubber-covered rolls and before mating with the other web or at the junction between the two cylinders. This obtains the stable junction with the other web between the facing protrusions of the embossings of the two webs. The protruding surfaces of the two embossing cylinders are obtained by removal of material, through mechanical or chemical procedures or others, so as to have the protrusions disposed in at least a series of rows equidistant from each other and parallel to the axis of the cylindrical surface. Preferably, the protrusions are also aligned in a second series of rows at a right angle to the rows of the previously mentioned series and primarily according to the circumferential rows of protrusions.

Also lines formed by repetitive patterns are similar to rows of protrusions.

In the embossing units of the above mentioned and known type. drawbacks are found on the rubber covering of the pressure rollers which cooperate with the embossing cylinders. In particular, there occurs a repetitiveness of the positions in which the protrusions of the embossing cylinders contact the rubber-covered surface, with consequent deformation of said rubber-covered surface in the course of time until the rubber-covered roll or the rubber covering thereof needs to be replaced.

An object of the invention is that of avoiding those drawbacks due to the repetitiveness of positions of the embossing cylinder protrusions onto the rubber-covered rolls, especially where circumferential rows of protrusions of the embossing cylinders contact the rubber covering.

Furthermore, the prior-art arrangement of the protrusion rows parallel to the axis causes, during operation, vibrations and concentrated and repeated stresses. This is due to the fact that one row of protrusions of one embossing cylinder contact simultaneously one row of protrusions of the other cylinder, in order to compress the two paper webs present between the opposed tips of the protrusions of the two cylinders. This causes variations of stress condition between the contact positions and non-contact positions of the protrusions of the rows which follow one after the other, and thus concentrated stresses, vibrations, and drawbacks as far as the dimensioning, maintenance and life of the various elements are concerned.

Another object of the invention is that of avoiding these drawbacks which are known to those skilled in the art.

These and other objects will be evident to those skilled in the art by the reading of the following description.

According to the present invention, an embossing cylinder has rows of protrusions, created with a pattern inclined with respect to the planes passing at right angle through the axis of the cylinders, in order to avoid or at least reduce the repetition of pressure actions in localized circumferential zones of the pressure roller.

Furthermore, in a machine of the above-mentioned type in which the protrusions of the embossing cylinders are disposed in at least one series of substantially longitudinal equi-distant rows, said rows of protrusions are created with a pattern inclined with respect to the axis of the relevant cylindrical surfaces, whereby to provide a helicoidal pattern with corresponding inclinations in the zone of contact between the protrusions of the two cylinders. Thus, there is obtained a subsequent and progressive contact on rows of cooperating protrusions of the two cylinders instead of a simultaneous contact throughout the row. This is particularly advantageous where the protrusions of the two embossing cylinders cooperate at the junction of the two paper webs.

In a preferred embodiment, a row of protrusions is developed with a minimum inclination with respect to the axis of the cylindrical surface.

When the embossing protrusions are created in two rows of almost pyramid frustrum-like or equivalent protrusions, with the rows of one series crossing those of the other series, both of the series of helicoidal developement, one avoids, or at least reduces, the repetitiveness of the pressure on localized zones of the rubber-covered rollers.

With the above and other objects in view, more information and a better understanding of the present invention may be achieved by reference to the following detailed description.

DETAILED DESCRIPTION

For the purpose of illustrating the invention, there is shown in the accompanying drawings a form thereof which is at present preferred, although it is to be understood that the various instrumentalities of which the invention consists can be variously arranged and organized, and that the invention is not limited to the precise arrangements and organizations of the instrumentalities as herein shown and described.

BRIEF DESCRIPTION OF THE DRAWINGS

In the drawings, wherein like reference characters indicate like parts.

DESCRIPTION OF THE PREFERRED EMBODIMENTS

Figure 1:
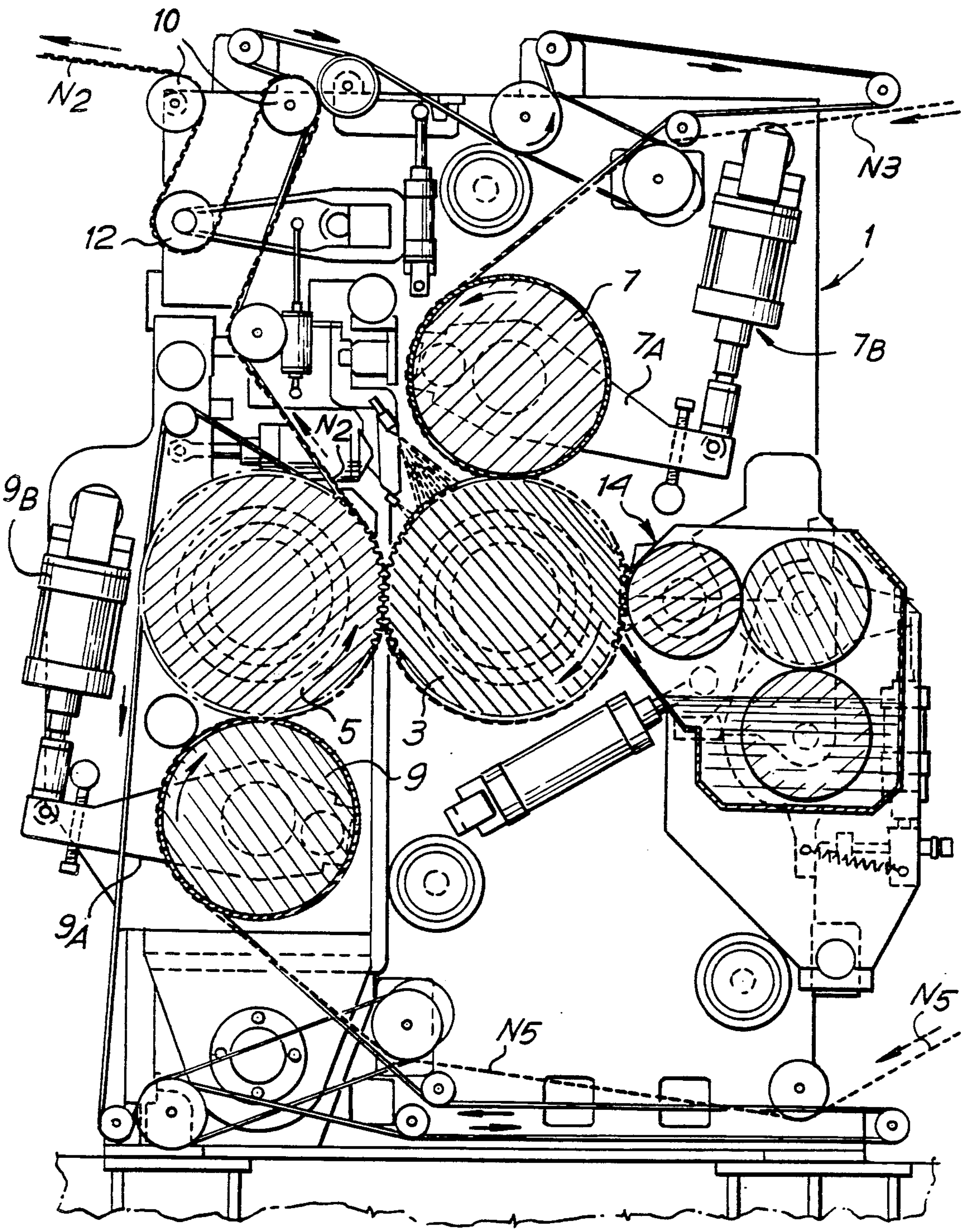
FIG. 1 shows very schematically an embossing unit which produces tip-to-tip embossing.

According to the drawings within a housing 1, two embossing cylinders 3 and 5 respectively are mounted, which are disposed with their axes parallel to each other. The embossing surfaces are in contact one with the other at the tips S of embossing protrusions. Cooperating with the embossing cylinder 3 is a roll having a surface 7 which is yielding (such as rubber-coated or non-elastic) and which provides a pressure surface for cooperating with the embossing surface of cylinder 3.

Numeral 9 indicates another pressure roller similar to that indicated by 7, for cooperating with the embossing cylinder 5. The two rollers 7 and 9 are mounted on arms 7A and 9A respectively, which are pivoted and resiliently urged (for example, by cylinder-piston systems 7B and 9B) to press the respective rollers 7 and 9 against the corresponding embossing cylinders. Both pressure rollers 7 and 9 may be located beneath the respective embossing cylinders or both above them.

N3 and N5 indicate the two paper webs which are fed between cylinder 3 and roller 7 are respectively between cylinder 5 and roller 9 in order to be embossed. The two embossed webs are driven around cylinders 3 and 5 and are joined together at protrusions S in facing relationship on the embossed webs, through a so-called tip-to-tip combining procedure. A two-ply web N2 is thus obtained which is moved away by passing it between driving rollers 10 and 12 or in any other suitable and known way. For combining the two paper webs there is provided a suitable adhesive applicator 14, which is urged against the web N3 on the surface of cylinder 3 to apply adhesive onto the web N3 which rests on the tips of the protrusions of cylinder 3. The adhesive is transferred by web N3, as said cylinder 3 turns to the junction thereof with web N5 in the nip between the protrusions of cylinders 3 and 5. This is the so-called tip-to-tip arrangement.

Figure 2:
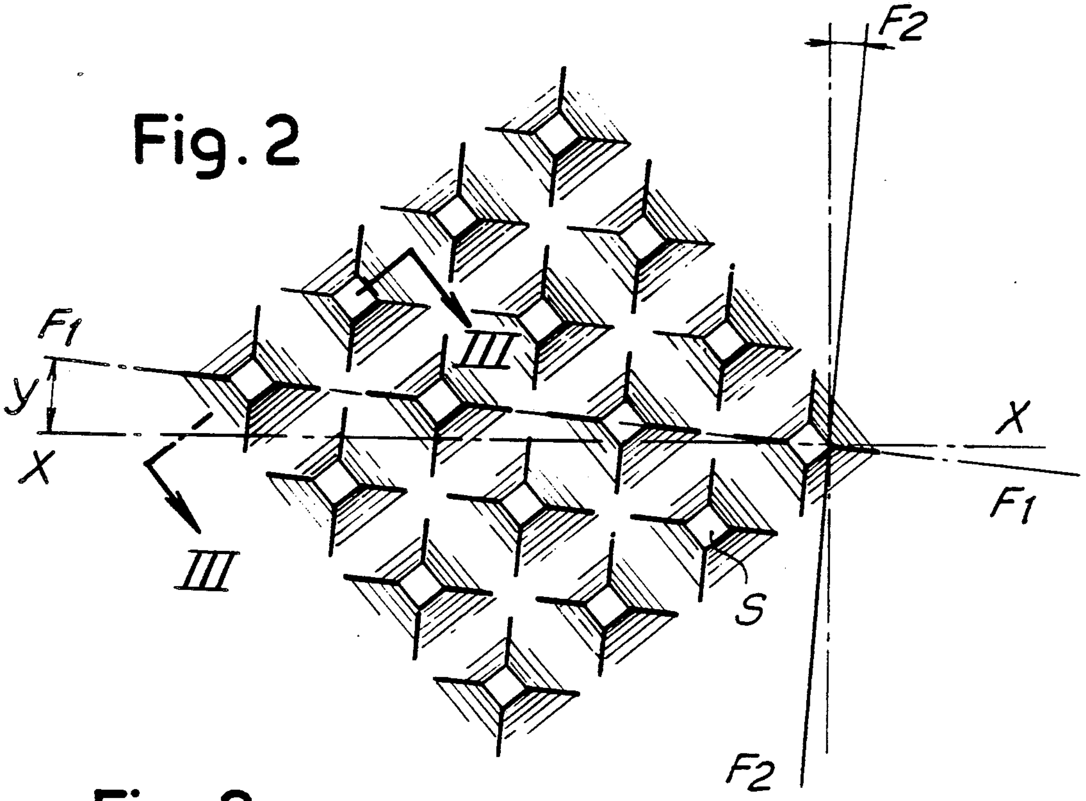
FIG. 2 shows a plan view of a portion of an embossing surface with almost pyramidal-frustum protrusions in two series of protrusions, with the rows of one series being at a right angle to those of the other series.
Figure 3:
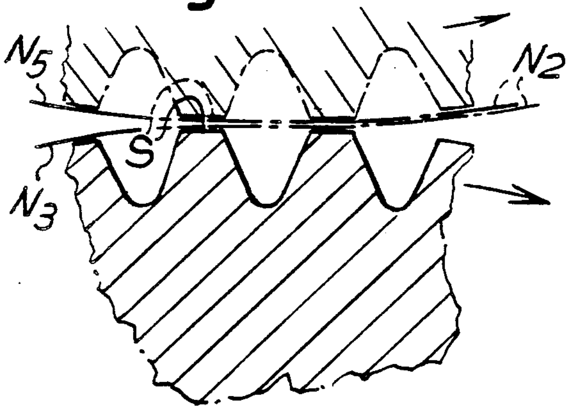
FIG. 3 shows a local section on line III—III of FIG. 2.

According to the invention, instead of having, as usual, rows of protrusions which are parallel to the axes of the two embossing cylindrical surfaces of cylinders 3 and 5, there is provided that the row of one series of protrusions be slightly inclined with respect to the respective axis, and thus with a slightly helicoidal development according to an axis F1—F1 which forms an angle Y with respect to the axis and with respect to the projection of the axis of rotation X—X of the cylinder, as shown in FIG. 2. The protrusions which are mostly pyramid frustum-shaped with a tip S indicated in FIGS. 2 and 3, are distributed so as to be arranged not only along alignment F1—F1 (which is inclined by the angle Y with respect to axis X—X), but also along a further alignment F2—F2 which is inclined by the same angle Y with respect to a plane disposed at a right angle to the axis X—X of the cylindrical surface. This is achieved when the two series of aligned protrusion rows are perpendicular to one another in the crossing zone and are, therefore, both helicoidal and capable of being easily worked through operations of spiral turning or through chemical or other known processes.

Figure 4:
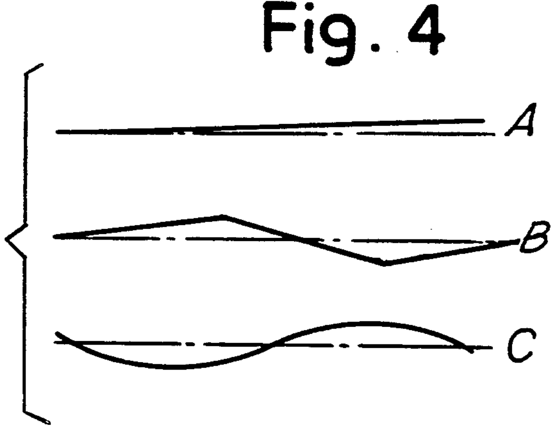
FIG. 4 shows examples of possible inclinations.

FIG. 4 shows possible examples of inclinations. Diagram A corresponds to what is illustrated in FIG. 1. Diagram B shows inclined broken lines, and diagram C shows gradually varying inclinations.

The arrangement of rows of protrusions remains valid even when the alignment is formed by repetitive patterns.

By this inclined disposition of the rows of protrusions, with the mutual rotation of the embossing cylinders 3 and 5 according to the arrows of FIG. 1, there is prevented a simultaneous contact of all the protrusions of one row with the corresponding protrusions of the cooperating row of the other cylinder, which causes the above-mentioned drawbacks. With the above-mentioned inclination, there occurs a progressive contact of the protrusions of one row with those of the corresponding row of the other cylinder and, therefore, a gradual and a substantial uniform contact is obtained without concentrations of stresses and without vibrations of the type caused by the instantaneous and simultaneous contact of the tips lined up according to the axes of the embossing cylinders of traditional type.

In this way, the vibrations and concentrated stresses are avoided, and there is obtained a very regular operation and a very satisfactory result in the working of the paper through an improved machine according to the invention.

As the circumferential alignment of the protrusions is avoided, in any way there is avoided a repetition of contacts along circumferences on the pressure rollers which, instead, are in contact with the protrusions in such a way that the wear will be distributed all over the surface.

It is understood that the drawing shows an exemplification given only as a practical demonstration of the invention, as this may vary in the forms and dispositions without, nevertheless, coming out from the scope of the idea on which the invention is based.

Having thus described my invention, what I claim as new and desire to protect by Letters Patent are the following:

1. A machine for a paper converting industry, said machine having two embossing cylinders rotatable on axes, each cylinder having a plurality of protrusions on its surface, and each with a cooperating pressure roller, to emboss a pattern onto two respective paper webs,
   the plurality of protrusions on each cylinder being disposed in a pattern of rows, each of which row is inclined with respect to a plane passing, perpendicularly through the axis of each cylinder,
   said protrusions being disposed in such a way that each protrusion is aligned with each one of the adjacent protrusions according to lines which are all inclined with respect to a plane passing through the axis of each cylinder,
   thus reducing the repetition of pressure actions in localized circumferential zones of the pressure roller.

2. A machine according to claim 1 wherein the pressure rollers have a resilient surface.

3. A machine according to claims 1 or 2 in which the rows of protrusions have a development with constant angles.

4. A machine according to claims 1 or 2 in which the rows of protrusions have a broken-line development.

5. A machine according to claims 1 or 2 in which the rows have a development with continuously verying angles to the cylinder-axis.

6. A machine according to claims 1 or 2 in which the inclined alignment is formed by repetitive patterns.

7. A machine according to claim 1, in which said rows of protrusions are developed in a helicoidal pattern.

8. A machine according to claim 1, wherein said protrusions are disposed in such a way that each protrusion is aligned with each one of the adjacent protrusions according to lines which are all inclined with respect to the axis of the cylinder,
   thus obtaining, on rows of cooperating protrusions of the two cylinders a subsequent and progressive contact instead of a simultaneous contact.

9. A process of embossing and bonding two webs of paper which process comprises passing each web between an embossing cylinder having a pattern of protrusions and a roller having a resilient cover, and then through a nip formed between two adjacent embossing cylinders, wherein each web is embossed according to a pattern of protrusions, each of which is aligned with each one of the adjacent protrusions according to lines which are all inclined with respect to a plane passing perpendicularly through the axis of the cylinder, each of said protrusions being aligned with each one of the adjacent protrusions according to lines which are all inclined with respect to the axis of the cylinder.

10. A process according to claim 9 wherein each web is embossed according to a pattern of protrusions, each of which is aligned with each one of the adjacent protrusions according to lines which are all inclined with respect to the axis of the cylinder.

* * * * *